US012748929B2

(12) United States Patent
Hoots et al.

(10) Patent No.: US 12,748,929 B2
(45) Date of Patent: Sep. 29, 2026

(54) SUMMARIZING COLLABORATIVE DATA BASED ON DETERMINED USER INTEREST AND STATUS

(71) Applicant: INTERNATIONAL BUSINESS MACHINES CORPORATION, Armonk, NY (US)

(72) Inventors: Harry Hoots, Raleigh, NC (US); Panav Setia, Southborough, MA (US); Connor Paul, Raleigh, NC (US); Jana H. Jenkins, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 208 days.

(21) Appl. No.: 17/985,958

(22) Filed: Nov. 14, 2022

(65) Prior Publication Data

US 2024/0160850 A1 May 16, 2024

(51) Int. Cl.

*G06F 40/40* (2020.01)
*G06F 16/34* (2019.01)
*G06F 16/355* (2025.01)

(52) U.S. Cl.

CPC ............ *G06F 40/40* (2020.01); *G06F 16/345* (2019.01); *G06F 16/355* (2019.01)

(58) Field of Classification Search

CPC .... G06F 16/345; G06F 16/355; G06F 16/214; G06F 16/3337; G06F 16/3344;

(Continued)

(56) References Cited

U.S. PATENT DOCUMENTS 6,778,941 B1 8/2004 Worrell
7,706,740 B2 * 4/2010 Collins ................. H04H 60/13 455/3.06

(Continued)

OTHER PUBLICATIONS

Barzilay et al., "Sentence Fusion for Multidocument News Summarization", Computational Linguistics, vol. 31, No. 3, Mar. 19, 2005, pp. 297-327.

(Continued)

*Primary Examiner* — Gerald Gauthier
(74) *Attorney, Agent, or Firm* — Steven M. Bouknight

(57) ABSTRACT

A method for automatically and electronically generating a communication summary based on communications received on electronic communication systems is provided. The method may include, automatically determining whether new and different communications received on an electronic communication system relates to stored topics of interest to the user. The method may further include, in response to determining that the received new and different communications relate to the stored topics of interest, automatically extracting content from the new and different communications, and associating and storing the extracted content associated with at least one new communication with at least one related topic of interest from the stored topics of interest. The method may further include automatically generating and displaying the communication summary comprising the extracted content from the received new and different communications and presenting and labeling the new and different communications with the at least one related topic of interest.

20 Claims, 4 Drawing Sheets

(58) Field of Classification Search
CPC ...... G06F 16/35; G06F 16/9538; G06F 40/12; G06F 40/205; G06F 40/211; G06F 40/258; G06F 40/284; G06F 40/35; G06F 40/40; G06Q 10/063; G10L 15/063; G10L 15/1815; G10L 15/183; G10L 15/22; H04H 60/13; H04H 60/65; H04L 67/131; H04N 21/4424
See application file for complete search history.

(56) References Cited

U.S. PATENT DOCUMENTS

| | | | | |
|---|---|---|---|---|
| 8,332,762 | B2 | 12/2012 | Lee | |
| 8,515,336 | B2 * | 8/2013 | Collins | H04N 21/44224 455/3.06 |
| 9,154,533 | B2 * | 10/2015 | Morrison, III | H04N 21/4424 |
| 10,574,613 | B2 | 2/2020 | Leiba | |
| 10,977,258 | B1 | 4/2021 | Liu | |
| 11,074,284 | B2 | 7/2021 | Cunico | |
| 11,126,796 | B2 | 9/2021 | Chhabra | |
| 11,145,122 | B2 * | 10/2021 | Kollencheri Puthenveettil | H04L 67/131 |
| 11,630,958 | B2 * | 4/2023 | Ronen | G06F 16/345 704/9 |
| 2002/0002450 | A1 * | 1/2002 | Nunberg | G06F 16/35 707/E17.09 |
| 2004/0153309 | A1 * | 8/2004 | Lin | G06F 40/40 704/9 |
| 2005/0235034 | A1 | 10/2005 | Chen et al. | |
| 2008/0126990 | A1 | 5/2008 | Kumar et al. | |
| 2010/0169910 | A1 * | 7/2010 | Collins | H04H 60/65 725/14 |
| 2011/0004462 | A1 * | 1/2011 | Houghton | G10L 15/183 704/E15.005 |
| 2012/0166179 | A1 * | 6/2012 | Tirumalachetty | G06F 40/258 704/E11.001 |
| 2012/0253793 | A1 * | 10/2012 | Ghannam | G06F 16/3344 704/9 |
| 2013/0179151 | A1 * | 7/2013 | Iverson | G10L 15/063 704/9 |
| 2015/0081276 | A1 * | 3/2015 | Gerard | G06F 40/211 704/9 |
| 2015/0081277 | A1 * | 3/2015 | Behi | G06F 40/205 704/9 |
| 2015/0170646 | A1 * | 6/2015 | Fujii | G10L 15/22 704/9 |
| 2016/0048856 | A1 * | 2/2016 | Wouhaybi | G06Q 40/12 705/7.33 |
| 2016/0085743 | A1 * | 3/2016 | Haley | G06F 40/284 704/9 |
| 2016/0132483 | A1 * | 5/2016 | Chelst | G06F 40/35 704/9 |
| 2016/0188573 | A1 * | 6/2016 | Tang | G10L 15/1815 704/9 |
| 2016/0248716 | A1 * | 8/2016 | Chowdhury | H04L 67/535 |
| 2017/0148050 | A1 * | 5/2017 | Montero | G06Q 10/063 |
| 2018/0287981 | A1 * | 10/2018 | Leiba | G06Q 50/01 |
| 2020/0273054 | A1 * | 8/2020 | Wouhaybi | G06Q 30/06 |
| 2023/0122341 | A1 * | 4/2023 | Santo | G06F 16/3337 704/9 |
| 2023/0139831 | A1 * | 5/2023 | Wang | G06F 16/3344 704/9 |
| 2023/0196020 | A1 * | 6/2023 | Thoniparambil | G06F 16/3344 704/9 |
| 2023/0325606 | A1 * | 10/2023 | Mahendravarman | G06F 16/214 704/9 |
| 2023/0401274 | A1 * | 12/2023 | Denninghoff | G06F 16/9538 |
| 2024/0160850 | A1 * | 5/2024 | Hoots | G06F 16/345 |

OTHER PUBLICATIONS

Healey et al., "Visual Analytics of Text Conversation Sentiment and Semantics", Computer Graphics Forum, 2021, 13 pages.
Uthus et al., "Plans Toward Automated Chat Summarization", Proceedings of the Workshop on Automatic Summarization for Different Genres, Media, and Languages, Jun. 23, 2011, pp. 1-7.

* cited by examiner

300

| INTEREST PERCENTAGE 308 | TOPIC OF INTEREST 302 | CONTENT 304 | TIMESTAMP 306 | USER-GENERATED 310 |
|---|---|---|---|---|
| **90%** | Release code 22.0.0.1 | **Joe:** I get an error like this when I try to build the latest release code for 22.0.0.2 - > ClassNotFoundException: ServerStart.Java<br>**Fred:** Hey Joe, there was a problem with ServerStart.java that was reverted, and then fixed in 22.0.0.1 release in github.<br>**Fred:** Try downloading the latest version of the code and doing a rebuild on your local computer to get pass the issue.<br>**Joe:** Thanks Fred! That fixed the issue | Fri, Jan 7, 2022 12:06:03 PM | NO |
| **85%** | All Hands Meeting | Calendar Invite: ALL HANDS MEETING, January 16th, 2022, @1:00 PM | Tue, Dec 28th, 2021 4:12:08 PM | NO |
| **80%** | Holiday Schedule 2022 | RTBot: 2022 U.S. Holiday Schedule<br>In 2022, the following 8 holidays will be observed nationally in the U.S.: New Year's Day, January 3rd (Observed); Martin Luther King Jr. Day Monday, January 17th; Memorial Day, Monday May 30th; Independence Day, Monday July 4th; Labor Day, Monday, September 5th; Thanksgiving Day, Thursday, November 24th; Day After Thanksgiving, Friday, November 25th; Christmas Day, (Observed) Monday, December 26th. | Wed, Dec. 29th, 2021 12:16:37 OM | YES |

FIG. 3

SUMMARIZING COLLABORATIVE DATA BASED ON DETERMINED USER INTEREST AND STATUS

BACKGROUND

The present invention relates generally to the field of computing, and more specifically, to electronic communications including summarizing communications from collaborative electronic messaging interfaces based on user interest and a user status.

Generally, electronic communications may include, but is not limited to, electronic mail (e-mail) systems whereby communications may be stored and transmitted electronically, chat and messaging interfaces that may transmit communications via a computer network and/or over a cellular phone network, voicemail systems which may store and transmit voice communications, facsimile and imaging equipment which may store and transmit images, and other systems where images, audio, or text are stored and transmitted in an electronic format. For instance, in a messaging/chat interface such as Slack® (Slack and all Slack-based trademarks and logos are trademarks or registered trademarks of Slack Technologies, Inc. and/or its affiliates) or Microsoft Teams® (Microsoft Teams and all Microsoft Teams-based trademarks and logos are trademarks or registered trademarks of Microsoft Corporation and/or its affiliates), users may be able to share files and collaborate on such files as well as instantly message and make calls to an entire group of people in the messaging/chat interface.

SUMMARY

A method for automatically and electronically generating a communication summary based on communications received on one or more electronic communication systems is provided. The method may include, automatically determining whether new and different communications received on an electronic communication system relates to one or more stored topics of interest to the user. The method may further include, in response to determining that the received new and different communications relate to the one or more stored topics of interest, automatically extracting content from the new and different communications, and associating and storing the extracted content associated with at least one new communication with at least one related topic of interest from the one or more stored topics of interest. The method may further include automatically generating and displaying the communication summary, wherein the communication summary comprises the extracted content from the received new and different communications, and wherein displaying the communication summary further comprises presenting and labeling the new and different communications with the at least one related topic of interest.

A computer system for automatically and electronically generating a communication summary based on communications received on one or more electronic communication systems is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include, automatically determining whether new and different communications received on an electronic communication system relates to one or more stored topics of interest to the user. The method may further include, in response to determining that the received new and different communications relate to the one or more stored topics of interest, automatically extracting content from the new and different communications, and associating and storing the extracted content associated with at least one new communication with at least one related topic of interest from the one or more stored topics of interest. The method may further include automatically generating and displaying the communication summary, wherein the communication summary comprises the extracted content from the received new and different communications, and wherein displaying the communication summary further comprises presenting and labeling the new and different communications with the at least one related topic of interest.

A computer program product for automatically and electronically generating a communication summary based on communications received on one or more electronic communication systems is provided. The computer program product may include one or more computer-readable storage devices and program instructions stored on at least one of the one or more tangible storage devices, the program instructions executable by a processor. The computer program product may include program instructions to automatically determine whether new and different communications received on an electronic communication system relates to one or more stored topics of interest to the user. The computer program product may also include program instructions to, in response to determining that the received new and different communications relate to the one or more stored topics of interest, automatically extract content from the new and different communications, and associating and storing the extracted content associated with at least one new communication with at least one related topic of interest from the one or more stored topics of interest. The computer program product may further include program instructions to automatically generate and display the communication summary, wherein the communication summary comprises the extracted content from the received new and different communications, and wherein displaying the communication summary further comprises presenting and labeling the new and different communications with the at least one related topic of interest.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3 is an example communication summary generated using the electronic communication summarization program according to one embodiment;

DETAILED DESCRIPTION

Figure 1:
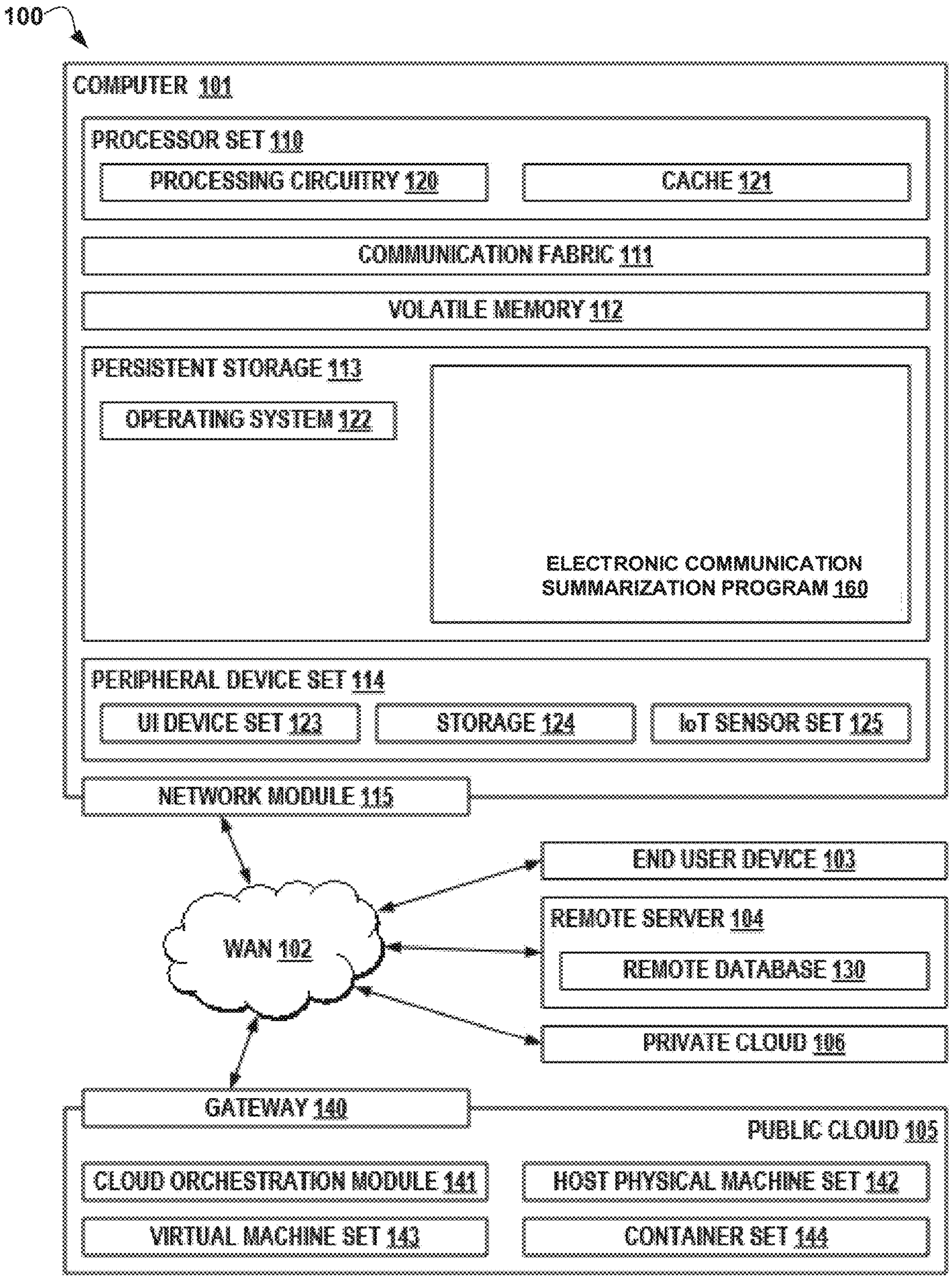
FIG. 1 illustrates an exemplary computing environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to automatically and electronically generating a communication summary based on a plurality of communications received on one or more electronic communication systems. Specifically, the present invention may be able to improve the technical field associated with electronic communications (such as chat systems/interfaces, email clients/interfaces, and other electronic communication systems) by determining topics of interest to the user directly from received electronic communications (such as messages and emails) and presenting a communication summary that summarizes the electronic communications according to the topic of interest. Furthermore, the present invention may automatically generate and display the communication summary based on a user status, such as a user status indicating that a user is not monitoring new and incoming communications on an electronic communication system. Specifically, the present invention may automatically determine whether a new communication received on the electronic communication system relates to a topic of interest to the user, wherein the new communication comprises a communication received, for example, during a time period that a user status remains inactive; in response to determining the received new communication relates to the topic of interest, automatically extract content from the new communication and associate the extracted content with the topic of interest; and in response to detecting that the user status switches from inactive to active, generate and display the communication summary, wherein the communication summary comprises the extracted content from the received new communication, and wherein displaying the communication summary further includes labeling and presenting the new communication according to the topic of interest.

More specifically, and as previously described, electronic messaging systems and interfaces may allow users to perform actions such as email, instantly message, make calls, share files, and collaborate on files with an entire group of people in the electronic messaging system and interface. However, when using such collaborative electronic messaging applications (like Slack®, Microsoft Teams®, etc.), if a user does not constantly track the application in real-time, important communications related to a topic that may be of a particularly interested to the user can often be overlooked or missed completely. Specifically, for example, as the number of channels, chats, and other electronic communications engaged in by a user on a given electronic communication program/system increases, the less reasonable it is to expect the user to track all of the new incoming content while still having time to complete their work. This scenario is especially true when a user is out of the office or on vacation over an extended period of time where the user is not actively tracking the electronic communication program/system for the new content.

Therefore, it may be advantageous, among other things, to provide a method, computer system, and computer program product for automatically and electronically generating a communication summary based on communications received on one or more electronic communication systems. Specifically, the method, computer system, and computer program product may, in response to detecting a first change in a user status on an electronic communication system, automatically determine whether a new communication received on the electronic communication system relates to a topic of interest to the user, wherein the new communication includes a communication received during a time period that the first change remains in effect (such as a user status remaining inactive). Then, in response to determining the received new communication relates to the topic of interest, the method, computer system, and computer program product may automatically extract content from the new communication and associate and store the extracted content with the topic of interest. Next, the method, computer system, and computer program product may automatically generate and display the communication summary, wherein the communication summary includes the extracted content from the received new communication, and wherein displaying the communication summary further includes labeling and presenting the extracted content according to the topic of interest. According to one embodiment, the method, computer system, and computer program product may automatically generate and display the communication summary in response to detecting a second change in the user status (such as a change from inactive to active).

The present invention may be a system, a method, and/or a computer program product at any possible technical detail level of integration. The computer program product may include a computer readable storage medium (or media) having computer readable program instructions thereon for causing a processor to carry out aspects of the present invention.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine whether directional input is received along with a query and, accordingly, adjust presented display content to include a referenced object in a center of a screen of a primary device.

Referring to FIG. 1, an exemplary computing environment 100 is depicted, according to at least one embodiment. Computing environment 100 contains an example of an environment for the execution of at least some of the computer code involved in performing the inventive methods, such as an electronic communication summarization program 160. In addition to block 160, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 160, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 160 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 160 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector and/or accelerometer.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the electronic communication summarization program 160 may be a program capable of automatically and electronically generating a communication summary based on communications received on one or more electronic communication systems. Specifically, the electronic communication summarization program 160 may, in response to detecting a first change in a user status (for example, indicating that a user is inactive) on an electronic communication system, automatically determine whether a new communication received on the electronic communication system relates to a topic of interest to the user, wherein the new communication comprises a communication received during a time period that the first change remains in effect. Then, in response to determining the received new communication relates to the topic of interest, the electronic communication summarization program 160 may automatically extract content from the new communication and associate and store the extracted content with the topic of interest. Next, the electronic communication summarization program 160 may generate and display the communication summary, wherein the communication summary includes the extracted content from the received new communication, and wherein displaying the communication summary further includes labeling and presenting the extracted content according to the topic of interest. According to one embodiment, the electronic communication summarization program 160 may generate and display the communication summary in response to detecting a second change in the user status, such as detecting a switch from inactive to active.

Furthermore, notwithstanding depiction in computer 101, the electronic communication summarization program 160 may be stored in and/or executed by, individually or in any combination, end user device 103, remote server 104, public cloud 105, and private cloud 106. The electronic communication summarization program is explained in further detail below with respect to FIGS. 2, 3, and 4.

Figure 2:
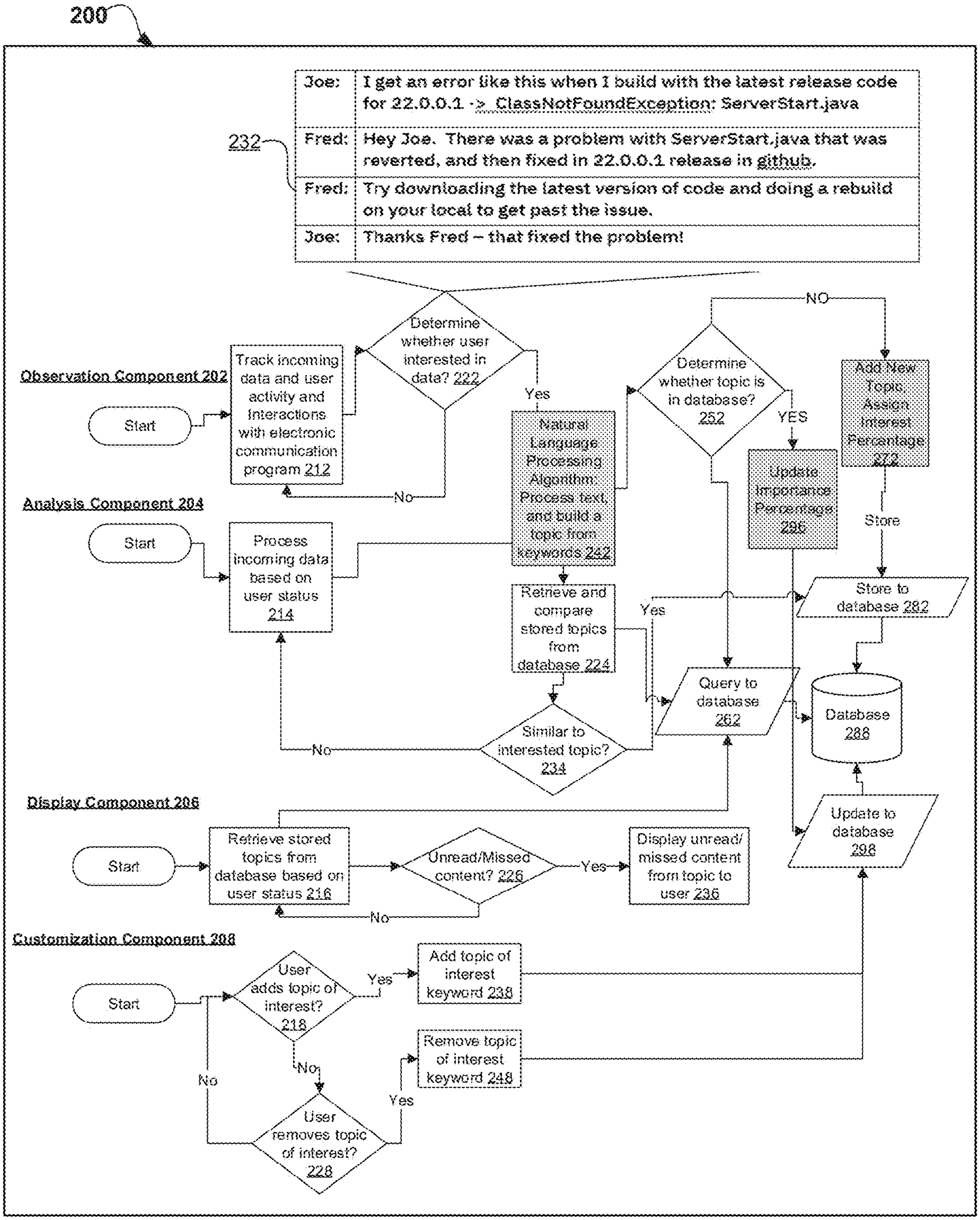
FIG. 2 is a system architecture further including an operational flowchart associated with an electronic communication summarization program according to one embodiment.

Referring now to FIG. 2, a system architecture 200 further including an operational flowchart associated with the electronic communication summarization program 160 is depicted. According to one embodiment, the electronic communication summarization program 160 may be a standalone program with integrated messaging/calling and/or a program embodied in, associated with, or in communication with one or multiple application programs such as an electronic communication program, internet program, and/or one or more other apps running on computer 101, or generally associated with exemplary computing environment 100. For example, the electronic communication program may include an email, personal text message, instant message/chat, voicemail, fax, and/or other electronic communication programs, systems and platforms. Furthermore, as depicted in FIG. 2, the electronic communication summarization program 160 may include interconnected components such as observation component 202, analysis component 204, display component 206, and customization component 208. The electronic communication summarization program 160, including each of the interconnected components, may also include natural language processing (NLP) algorithms and/or machine learning algorithms. For example, the electronic communication summarization program 160 may use NLP algorithms including text summarization algorithms, named entity recognition algorithms, topic modeling algorithms, aspect mining algorithms, and sentiment analysis algorithms to parse text and other parts of a communication to classify/identify the communication and/or different parts of the communication. The electronic communication summarization program 160 may also use image recognition, video recognition, and speech recognition tools.

Furthermore, machine learning as described herein may broadly refer to machine learning algorithms that learn from data. More specifically, machine learning is a branch of artificial intelligence that relates to algorithms such as mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusters, such as k-means clusters, mean-shift clusters, and spectral clusters; (v) factorization machines, principal component analyzers and kernel principal component analyzers; and (vi) ensembles or other combinations of machine-learning models. Neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Referring back to FIG. 2, the observation component 202 may use such NLP and/or machine learning algorithms to identify and generate topics of interest to the user. Specifically, and as described at 212, the electronic communication summarization program 160 may track data associated with an electronic communication program/system (for example, data including incoming messages/chat/emails, channel data, images, calls, video, and other electronically transmitted data), as well as track user interactions with such data and the electronic communication program/system, to identify and generate topics of interest to the user. More specifically, the electronic communication summarization program 160 may track user activities and interactions on the electronic communication program/system and automatically generate topics of interest from content on the electronic communication program/system by specifically analyzing how the user interacts with different features and the content on the electronic communication program/system. For example, the electronic communication summarization program 160 may use keylogging software and/or hardware as well as a camera to track user activities and interactions by detecting keystrokes, tracking eye movements, detecting mouse clicks as well as time spent interacting with the data on the electronic communication program/system. Furthermore, the electronic communication summarization program 160 may use NLP and machine learning to identify and process text, audio, video, and other content on the electronic communication program/system.

In turn, by tracking the data and the user activities and interactions, as well as correlating the data and the user activities and interactions to a level of interest to the user, the electronic communication summarization program 160 may identify topics that may be of interest and of no interest to the user, or of low interest and high interest to the user to represent the level of interest. The following list provides some examples of tracked user activities and interactions as well as a few correlations between the tracked user activities and interactions with a level of interest to the user that may be detected by the electronic communication summarization program 160:

A. Track mouse location, mouse clicks, and keystrokes
  1. click message/channel by right clicking→mark as read=no interest
  2. click message/channel, instantly click next message to mark as read=no interest
  3. click message/channel, quick scroll→no interest
  4. click message/channel, scroll through content in message/channel slowly=high interest
  5. click message/channel, scroll through message content slowly, create new user content (for example, create new message/reply, enter an emoji on message, etc.)=VERY high interest B. Track keywords and topics in message/channel and other content C. Track eye interaction (via camera) with messages/channel on electronic communication program/system D. Track screen touches (on enabled devices) on electronic communication program/system E. Track screen heat map for interactions with other apps based on interaction with the electronic communication program/system F. Track time spent on content associated with the electronic communication program/system (a threshold may be set whereby, for example, less than 10 seconds=no interest, 10-20 seconds=medium interest, greater than 20-30 seconds=high interest, greater than 30 seconds=very high interest)
  1. Track time spent on a particular topic
  2. Track time spent on a particular channel
  3. Track time spent on a particular conversation (direct message)
  4. Track content creation
     a. User-generated reactions (emoji usage)
     b. User-generated responses—character count and string length
        i. Short responses (for example, less than 3 words) =no interest
        ii. Couple of sentences=interest
        iii. Paragraphs=high interest Thus, according to one embodiment, the electronic communication summarization program 160 may use different tracked user activities and interactions to detect certain interest of the user, and more specifically, generate certain topics that may be of interest to the user. Specifically, each type of tracked user activity and interaction may provide an indication of the level of interest a user has towards a particular message/channel/content on the electronic communication program/system, and more specifically, to a topic extracted from the particular message/channel/content. Specifically, based on the level of interest, the electronic communication summarization program 160 may eventually identify, generate, and rank topics of interest for the user.

For example, and as described above and in FIG. 2 at 222 and 232, the electronic communication summarization program 160 may track user keystrokes and thereby detect a user clicking on a channel (and/or message thread) involving a communication between colleagues describing a particular error with a latest version of released code. The electronic communication summarization program 160 may use a combination of the time spent on the clicked-on message thread as well as certain actions toward the message thread, such as detecting the user submitting a response or providing an emoji, as an indication that the user has an interest in the topic presented in the message thread. Therefore, at 222, and according to one embodiment, the electronic communication summarization program 160 may use the different combinations of tracked user activities and interactions to detect user interest in the message thread. Furthermore, when using the tracked user activities and interactions to determine the user's level of interest in a message/channel/content, the electronic communication summarization program 160 may weigh certain user activities and interactions over others. Specifically, the electronic communication summarization program 160 may assign different weights to different types of tracked data (i.e. different types of messages) as well as different user activity and interactions, whereby the electronic communication summarization program 160 may present a user interface to the user to allow the user to customize which data may be tracked, how each type of data may be weighed, which activities and interactions may be tracked, and how activities and interactions may be tracked (such as user-generated weights placed on different types of user activity and interactions).

As such, and as depicted at 242 in FIG. 2, in response to determining that the user does have an interest in certain messages/channels/content being presented based on the tracked and correlated user activities and interactions, the electronic communication summarization program 160 may again use the NLP algorithms (and/or machine learning algorithms) to automatically process the content and thereby automatically generate a topic of interest based on the content. Specifically, the electronic communication summarization program 160 may use NLP to process the content from the message for which the user showed interest by, for example, identifying and extracting content including keywords and phrases associated with the message, and subsequently determine a topic based on the extracted content. More specifically, for example, the electronic communication summarization program 160 may use NLP and/or machine learning to identify sequences of words in a sentence to provide context, identify any user responses/interactions (text, emojis, and other content outlined above) as context, use similarity algorithms and topic modeling to identify related and relevant material within a message/channel/content, and group related material to generate a keyword or phrase representative of a topic common throughout the message/channel/content. For instance, based on the message thread from the clicked-on channel 232 described in the previous example, the electronic communication summarization program 160 may use NLP (such as topic modeling) and/or machine learning to determine that "release code 22.0.0.1" is a common topic in the message thread, and thus, a topic of interest for the user.

Accordingly, and as depicted at 252, the electronic communication summarization program 160 may determine whether the topic of interest identified and automatically generated at 242 may already exists in a database 288. Specifically, at 262, the electronic communication summarization program 160 may query the database 288, which may include topics of interest that have already been generated and stored by the electronic communication summarization program 160 from other extracted content for which the user previously showed interest, to determine whether the topic of interest identified at 242 is similar to the one or more previously generated and stored topics. More specifically, the electronic communication summarization program 160 may query (at 262) the database 288 and use NLP and/or machine learning to compare keywords/phrases from the topic of interest that was identified at 242 to stored topics. In turn, and as previously described at 252, the electronic communication summarization program 160 may determine whether the identified topic of interest matches or relates to one or more stored topics. According to one embodiment, the electronic communication summarization program 160 may use NLP algorithms to determine a match between the identified topic and stored topics based on a threshold percentage. For example, the electronic communication summarization program 160 may determine that an identified topic matches a stored topic if the keywords and/or phrases are a match above a threshold percentage of 80%. Conversely, in response to the electronic communication summarization program 160 determining that the identified topic of interest at 242 does not match any of the stored topics (for example, falling below the threshold percentage), the electronic communication summarization program 160 may, at 272 in FIG. 2, automatically add the identified topic of interest as a new topic and set a base interest percentage/ranking to indicate a degree of interest that user has in the new topic. In turn, at 282, the electronic communication summarization program 160 may store the added new topic and base ranking on database 288. However, in response to the electronic communication summarization program 160 determining that the identified topic of interest does match a stored topic at 252, the electronic communication summarization program 160 may automatically update the interest percentage/ranking associated with the topic of interest at 296 as well as update the database (at 298).

Specifically, with reference to the interest percentage/ranking, in addition to using the tracked user activity and interactions to identify a level of interest a user may have in specific messages/channels/content (in turn, to identify a particular topic of interest), the electronic communication summarization program 160 may similarly use the tracked user activity and interactions to identify a level/degree of interest the user may have in that particular topic. For example, by tracking the user activity and interactions on the electronic communication program/system, the electronic communication summarization program 160, may identify a first topic for which the user consistently shows interest by, for example, detecting the user consistently clicking on or interacting with messages/channels related to that first topic over a certain or specified period of time. Conversely, the electronic communication summarization program 160 may identify a second topic for which the user may have previously showed interest but has not interacted with content related to that second topic during that same period of time. As such, the electronic communication summarization program 160 may include a ranking algorithm to assign and continuously update (at 296) an interest percentage (i.e. ranking) to topics stored on the database 288 to correspondingly indicate the topic's degree of interest to the user.

Thus, and as previously described, after a topic of interest is identified and automatically generated based on the tracked user activity and interactions, the electronic communication summarization program 160 determines whether the identified topic is already stored in the database 288. In response to detecting that the identified topic is not stored in the database 288, the electronic communication summarization program 160 may add the topic to the database 288 and assign a base ranking represented by an interest percentage. For example, for each added new topic to the database 288, the electronic communication summarization program 160 may assign an interest percentage (base ranking) of 40% (which may be a default setting and/or configurable). Conversely, in response to determining that the identified topic is already stored in the database 288, the electronic communication summarization program 160 may proportionally increase the interest percentage associated with the stored topic, whereby the increase to the interest percentage may be proportional to an amount (and weight) of tracked user activity and interaction related to the stored topic. According to one embodiment, the interest percentage may be calculated based on an exponential function associated with the ranking algorithm. According to another embodiment, the electronic communication summarization program 160 may increase the interest percentage incrementally and directly based on the tracked user activity and interaction. For example, for each tracked user activity and interaction related to a stored topic, the electronic communication summarization program 160 may incrementally increase the interest percentage by 3%. Conversely, in response to tracking no user activity and interactions associated with a stored topic over a certain period of time (whereby the period of time may be configurable), the electronic communication summarization program 160 may incrementally decrease the interest percentage after each period of time. Furthermore, based on the interest percentage being below a threshold level for a certain period of time, the electronic communication summarization program 160 may remove the topic of interest from the stored topics database 288. For example, based on a stored topic of interest being below a threshold percentage of 5%, and in response to detecting no activity or interactions related to the stored topic of interest over a set period time of 1 month while the interest percentage is at 5%, the electronic communication summarization program 160 may remove the stored topic of interest from the database 288. Also, as previously described, certain user activity and interactions may be weighted differently. For example, the electronic communication summarization program 160 may weigh @mentions and direct messages more than user glances over a channel. Therefore, according to one embodiment, the electronic communication summarization program 160 may increase or decrease the interest percentage (or ranking value) for a stored topic proportional to and based on a weight of the different types user activity and interactions, for example, by using an exponential function.

In addition to automatically generating topics of interest and automatically assigning interest percentages to the topics of interest as described above, the electronic communication summarization program 160 may also receive user feedback/customizations to add and remove topics as well as assign interest percentages to topics. Specifically, with reference to customization component 208 in FIG. 2, the electronic communication summarization program 160 may enable a user to customize which topics to add (at 218) and remove (at 228) from the database 288. For example, the electronic communication summarization program 160 may present in a user interface customization options. As previously described with respect to 222, the electronic communication summarization program 160 may present a user interface to the user to allow the user to customize which activities may be tracked and how activities may be tracked (such as placing different weights on different types of user activity and interactions). Additionally, electronic communication summarization program 160 may present the user with the user interface, which may further include a list of the topics of interest already stored on the database 288 as well as their assigned interest percentages, to enable the user to customize, add, remove, and edit topics of interest as well as the interest percentages. Furthermore, the user interface may enable the user to manually set a time period for older topics as well as interest percentages for topics to be removed from the database 288. For example, and as previously described, based on a stored topic of interest being below a manually set threshold percentage of 5%, and in response to detecting no activity or interactions related to the stored topic of interest over a manually set period time of 1 month while the interest percentage is at 5%, the electronic communication summarization program 160 may be configured to remove the stored topic of interest from the database 288. As such, in response to detecting the user adding a topic at 218 using the user interface by entering a keyword or phrase, the electronic communication summarization program 160 may add the topic at 238 (as well as set an interest percentage, or default base ranking if interest percentage is not manually set by the user), and update (at 298) the database 288. Similarly, in response to detecting the user removes a topic at 228 using the user interface, the electronic communication summarization program 160 may remove the topic at 248 and update (at 298) the database 288.

Furthermore, according to one embodiment, and as will be further described with respect to the analysis component 204 and the display component 206, the electronic communication summarization program 160 may also receive user feedback/customizations directly on a communication summary presented to the user via the display component 208, whereby the communication summary includes unread-missed content for the user based on a user status. In turn, the electronic communication summarization program 160 may add and/or remove topics, or reassign interest percentages to topics, based on a user's interaction with the communication summary. According to one embodiment, the user's interaction may include a user using a mouse and/or keyboard to drag, drop, and/or reorder the unread/missed content on the communication summary presented via the display component 206. Resultingly, and as will be further described, the user's interaction on the communication summary may trigger the analysis component 204 to process and analyze different types of new incoming communications based on a change in the interest percentages of the reordered topics.

According to one embodiment, the electronic communication summarization program 160 may also allow customization options enabling a user to import email/messages and calendar data from other applications/programs, and in turn, use NLP to extract topics from those imported emails/messages (such as from those marked as high priority or long message threads/chains) to identify topics of interest. The electronic communication summarization program 160 may also associate calendar events and their names/descriptions as locations for topics of interest.

Referring now to the analysis component 204, the electronic communication summarization program 160 may use the analysis component 204 to track and detect a user status. Specifically, for example, the user status may be indicative of whether the user is interacting with or otherwise using the electronic communication program/system and/or a device (such as computer 101 in FIG. 1) associated with the electronic communication program/system. More specifically, the user status may indicate whether a user is active or inactive with respect to the electronic communication program/system and/or computer 101, or more specifically, indicative of whether a user is actively monitoring or not actively monitoring incoming new communications. For example, the user status may be a function or feature on the electronic communication program/system and/or on the computer 101 that allows a user to set the user's online status typically to three standard options—Online/Away/Busy. In some cases, the user status feature may also include an option to provide even more details on the user's availability, such as in a meeting, at lunch, on vacation, etc. Additionally, the electronic communication summarization program 160, the electronic communication program/system, and/or the computer 101 may automatically check and set a user's status to "Away" after a period of inactivity on the computer 101. In this way, other users and the electronic communication summarization program 160 will know that the user is not currently at their computer, and therefore, not currently monitoring incoming communications.

Thus, and as described at 214, based on a first change to the user status from an active status to an inactive status, the electronic communication summarization program 160 may use the analysis component 204 to process and analyze different types of new incoming communications (chat, personal message, channel, email, and other content such as calendar invites/meetings, calls, video, etc.) that may be unread/missed by the user to determine whether the different types of data relates to a topic of interest to the user. According to one embodiment, the electronic communication summarization program 160 may automatically detect an active status by detecting that the user is using the computer 101 that includes the electronic communication program/system (such as detecting that the user is actively interacting with features on the computer 101 or scrolling through an interface on the computer 101), and/or may automatically detect an active status by detecting that the user is using the electronic communication program/system (such as by detecting that the user is actively interacting with features and messages on the program/system, scrolling over an interface associated with the program/system, and/or otherwise detecting an "Online" status). Also, according to one embodiment, and further depending on settings on the computer 101 and/or the electronic communication program/system, an active status may be automatically detected by the electronic communication summarization program 160 based on the user entering a status such as "Online" or even "Busy" and "In a meeting".

Conversely, an inactive status may indicate that the user is not using the electronic communication program/system and/or the computer 101 that includes the electronic communication program/system and, thus, indicating that the user is not actively monitoring new communications received on the electronic communication program/system. The electronic communication summarization program 160 may automatically detect an inactive status, and/or an indication that the user is not actively monitoring incoming communications, in different instances. For example, the electronic communication summarization program 160 may detect that the user is inactive or not actively monitoring communications based on inactivity by the user on the electronic communication program/system and/or on the device, whereby the inactivity may include a detection that the user is not scrolling, typing, viewing, or otherwise interacting with the electronic communication program/system and/or the computer 101 that includes the electronic communication program/system after a specified period of time. Furthermore, the electronic communication summarization program 160 may automatically detect that the user is inactive or not actively monitoring communications based on direct input from the user, such as by detecting the user entering a status or message on the function/feature indicating the user status (such as detecting entry of "Away", "Busy", "In a Meeting", and "Vacation"), the user entering time away or meeting information on an email/calendar application, and/or any other input from the user on the electronic communication summarization program 160 (via the user interface), on the computer 101, and/or on the electronic communication program/system to directly indicate to the electronic communication summarization program 160 that the user is not actively monitoring new incoming communications from the electronic communication program/system for a certain period of time.

In turn, and according to one embodiment, the electronic communication summarization program 160 may use the analysis component 204 to process incoming communications on the electronic communication program/system based on the user status, or more specifically, a first change in the user status as depicted at 214 in FIG. 2 (i.e. a change from active to inactive). Specifically, for example, the electronic communication summarization program 160 may detect the change to the user status indicating an inactive status by automatically detecting inactivity by the user on the computer 101 after 15 minutes, and in turn, may change the user status from "Online" to "Away." As such, in response to detecting the inactive status (and thus, an indication that the user is not actively monitoring incoming communications on the electronic communication program/system), the electronic communication summarization program 160 may trigger the analysis component 204 to process new communications on the electronic communication program/system (i.e. different incoming and unread data such as new chat messages, personal messages, channel messages, email, calendar invites, video, audio, and other received content) such that the new communications may be compared to topics of interest stored on the database 288, and if a match is found between the new communication and the stored topics, the new communication may be processed for eventual redisplay to the user using the display component 206. More specifically, in the context of an inactive status, a new/incoming communication may be a communication received subsequent to the change in the user status to inactive and during the time period that the inactive status remains effect (for example, remains inactive while the user is away or on vacation for instance). In turn, during the time period that the inactive status remains in effect, the electronic communication summarization program 160 may receive the new communication and the associated incoming data, use NLP and/or machine learning to process/parse the new communication by extracting text (keywords and phrases) and/or audio/video at 242 to identify a topic associated with the new incoming communication, and determine whether that identified topic is associated with stored topics of interest to the user. Specifically, and as depicted at 224, the electronic communication summarization program 160 may retrieve and compare the existing/stored topics of interest by querying (at 262) the database 288 to determine (at 234) whether the identified topic from the new communication that includes incoming/unread data matches at least one of the existing/stored topics. In response to determining that the identified topic from the incoming/unread data does not match an existing/stored topic, the electronic communication summarization program 160 may proceed to processing a next incoming communication. Conversely, in response to determining that the identified topic from the new communication does match an existing/stored topic, the electronic communication summarization program 160 may associate the incoming data from the new communication with the stored topic and also store the content from the new communication with a label of the stored topic so that the content may be retrieved and presented at a later point in time (for example, when the user becomes active).

For instance, taking the example of the channel message thread depicted at 232 in a different context, the electronic communication summarization program 160 may detect that the message thread 232 may be received during the time period that the user is determined to be inactive (and thus, the channel message thread at 232 may be an unread/missed communication). As such, based on the user inactive status, and in response to receiving the message thread at 214, the electronic communication summarization program 160 may use NLP algorithms at 242 to identify a topic associated with the message thread. As previously described, the electronic communication summarization program 160 may determine that the identified topic for the message thread is "release code 22.0.0.1." As such, at 224, the electronic communication summarization program 160 may retrieve and compare the existing/stored topics of interest by querying (at 262) the database 288 to determine (at 234) whether the identified topic—"release code 22.0.0.1"—from the incoming/unread data matches at least one of the existing/stored topics. In response to determining that the identified topic from the incoming/unread data does match an existing/stored topic, which may similarly be stored and labeled as "release code 22.0.0.1", the electronic communication summarization program 160 may associate the message thread 232 with the stored topic as well as store the content from the message thread 232 with the label of the stored topic in order for that content to be retrieved and presented to the user at a later point in time (for example, in response to detecting that the user is active).

Thereafter, using the display component 206, the electronic communication summarization program 160 may display a communication summary that includes the unread/missed content. Specifically, and as depicted at 216, the electronic communication summarization program 160 may automatically detect a second change in the user status, such as detecting the user status changing to an active status subsequent to the inactive status previously described. More specifically, and as previously described, the electronic communication summarization program 160 may detect that the user is inactive based on inactivity by the user on the electronic communication program/system and/or on the computer 101, whereby the inactivity may include a detection that the user is not scrolling, typing, viewing, or otherwise interacting with the electronic communication program/system and/or the device that includes the electronic communication program/system after a specified period of time. As such, the electronic communication summarization program 160 may then detect that the user is active based on the user scrolling, typing, viewing, or otherwise interacting with the electronic communication program/system and/or the computer 101 that includes the electronic communication program/system. According to another embodiment, the electronic communication program/system may detect that the user is active by detecting the user removing an away message and/or by detecting that the entered away time or meeting time on an email/calendar application has expired (for example, user vacation time has ended).

As such, and according to one embodiment, in response to automatically detecting a change in the user status indicating that the user is active subsequent to an inactive status by the user, the electronic communication summarization program 160 may automatically and instantly retrieve the stored topics of interest (at 216) and any data associated with the stored topics (such as unread/missed data stored with the existing topics) by querying (at 267) the database 288 to determine (at 226) whether the stored topics include new communications (i.e. the missed/unread data) received during the time period of the user's inactive status. For example, and as previously described, the electronic communication summarization program 160 may have identified a topic—"release code 22.0.0.1"—from the new communication received during the inactive status. Furthermore, the electronic communication summarization program 160 may have determined (at 234) that the identified topic—"release code 22.0.0.1"—from the new communication matches at least one of the stored topics. In response to determining that the identified topic from the new communication does match an existing/stored topic (which similarly may be stored as "release code 22.0.0.1"), the electronic communication summarization program 160 may associate the message thread 232 with the stored topic as well as store the content from the message thread 232 so that the content can be retrieved and presented to the user in response to detecting the user is active. Therefore, in response to retrieving the stored topics (at 216) and determining (at 226) that the database 288 does indeed include stored unread/missed content (new communications) associated with a topic of interest to the user (such as "release code 22.0.0.1"), the electronic communication summarization program 160 may automatically display that unread/missed content to the user at 236.

Thus, according to one embodiment, and as now depicted in FIG. 3, the electronic communication summarization program 160 may automatically display the new communications (i.e. unread/missed content) on a user's computing device upon detecting an active status from the user by presenting a communication summary 300 which may further include the topic of interest 302, content from the new communication 304 associated with the topic of interest 302, a timestamp 306 in which the new communication 304 was received, the interest percentage 308 associated with the topic of interest 302, and an indication 310 of whether the topic of interest was user-generated (represented by "YES") or automatically generated by the electronic communication summarization program 160 (represented by "NO"). Specifically, according to one embodiment, the communication summary 200 may be a user interface presentation of a pop-up window presented by the electronic communication summarization program 160. According to another embodiment, the electronic communication summarization program 160 may present the communication summary 300 in response to a user action. For example, the electronic communication summarization program 160 may present a notification to the user to notify the user that there is/are new communications (unread/missed content) associated with a topic of interest to the user, and upon action from the user (such as the user clicking on the notification), the electronic communication summarization program 160 may present the communication summary 300 via the pop-up window.

Furthermore, according to one embodiment, the electronic communication summarization program 160 may present the unread/missed content in ranking order based on the interest percentage/ranking associated with a corresponding topic of interest. As previously described, the electronic communication summarization program 160 may include a ranking algorithm to assign and continuously update (at 296) an interest percentage (i.e. ranking) to topics stored on the database 288 to indicate the topic's degree of interest to the user. Accordingly, when presenting the unread/missed content, the electronic communication summarization program 160 may present the unread/missed content according to the interest percentages associated with the corresponding stored topics of interest such that the unread/missed content associated with a highest ranking topic of interest is presented first followed by subsequent topics of interest which may be presented in descending rank order according to the interest percentage. For example, and as depicted in FIG. 3, because the interest percentage associated with the topic of interest—"release code 22.0.0.1"—has an interest percentage of 90%, which is higher than the rest of the stored topics, new communications associated "release code 22.0.0.1" may be presented first when displaying the communication summary 300. Furthermore, in the case of multiple new communications for a given topic, the electronic communication summarization program 160 may present the new communications for that topic in an order based on the timestamp for that new communication. Additionally, based on the user specifically clicking on or viewing the new communications in the communication summary 300, and/or based on the user simply viewing the communication summary 300, the electronic communication summarization program 160 may remove from the database 288 the stored content associated with the new communications presented in the communication summary 300 (i.e. remove the new communication from the database 288).

As previously described, with reference to customization component 208 in FIG. 2, the electronic communication summarization program 160 may enable a user to customize which topics to add (at 218) and remove (at 228) from the database 288. Additionally, the electronic communication summarization program 160 may present the user with a user interface, which may further include a list of the topics of interest already stored on the database 288 as well as their assigned interest percentages, and enable the user to customize, add, remove, and edit topics of interest as well as the interest percentages. Additionally, and as previously described, the electronic communication summarization program 160 may also receive user feedback/customizations directly on the communication summary 300. According to one embodiment, the user feedback/customizations may include a user using a mouse and/or keyboard to drag, drop, and/or reorder the unread/missed content on the communication summary 300. For example, the electronic communication summarization program 160 may detect user feedback whereby the user drags content associated with a presented first topic (such as "release code 22.0.0.1") below a presented second topic (such as "All Hands Meeting") on the communication summary 300. Accordingly, the electronic communication summarization program 160 may detect user feedback of dragging the presented first topic below the presented second topic as an indication that the first topic is less important than the second topic. The electronic communication summarization program 160 may also detect user feedback including the user adding or removing a topic from the communication summary 300. The electronic communication summarization program 160 may also detect the user directly editing topics of interest (such as changing the wording of a presented topic) and/or the interest percentages associated with the topics of interest on the communication summary 300. In turn, the electronic communication summarization program 160 may add, remove, and edit topics of interest on the database 288, and/or reassign interest percentages associated with the stored topics of interest on the database 288, based on the detected user feedback on the communication summary 300. For example, based on the dragging of the presented first topic as previously described, the electronic communication summarization program 160 may incrementally decrease the interest percentage associated with the topic "release code 22.0.0.1", and conversely, incrementally increase the interest percentage associated with the presented second topic (whereby, for example, the second topic may resultingly have an interest percentage above the interest percentage of the first topic). Furthermore, the user feedback on the communication summary 300 may trigger the analysis component 204 to, in turn, process and analyze the different types of new incoming communications based on any updated changes to the topic of interests on the database 288 via the additions, removals, and/or reordering of topics on the communication summary 300.

According to one embodiment, the electronic communication summarization program 160 may be integrated with multiple electronic communication programs/systems, and therefore, the communication summary 300 may include new communications from each of the different electronic communication programs/systems. For example, the electronic communication summarization program 160 may track incoming data and user activity and interactions associated with multiple electronic communication systems, such as Slack®, Microsoft Teams®, an email client program, etc. In turn, the electronic communication summarization program 160 may formulate and store topics as previously described based on communications from each of the different electronic communication programs/systems. Accordingly, in response to detecting a change in the user status for multiple electronic communication programs/systems, the electronic communication summarization program 160 may initiate the process for automatically displaying the new communications on a user's computing, and ultimately present a communication summary 300 that may include new communications (or unread/missed content) 304 from each of the different electronic communication programs/system (i.e. Slack®, and email client program, etc.) associated with given topic of interest 302.

Figure 4:
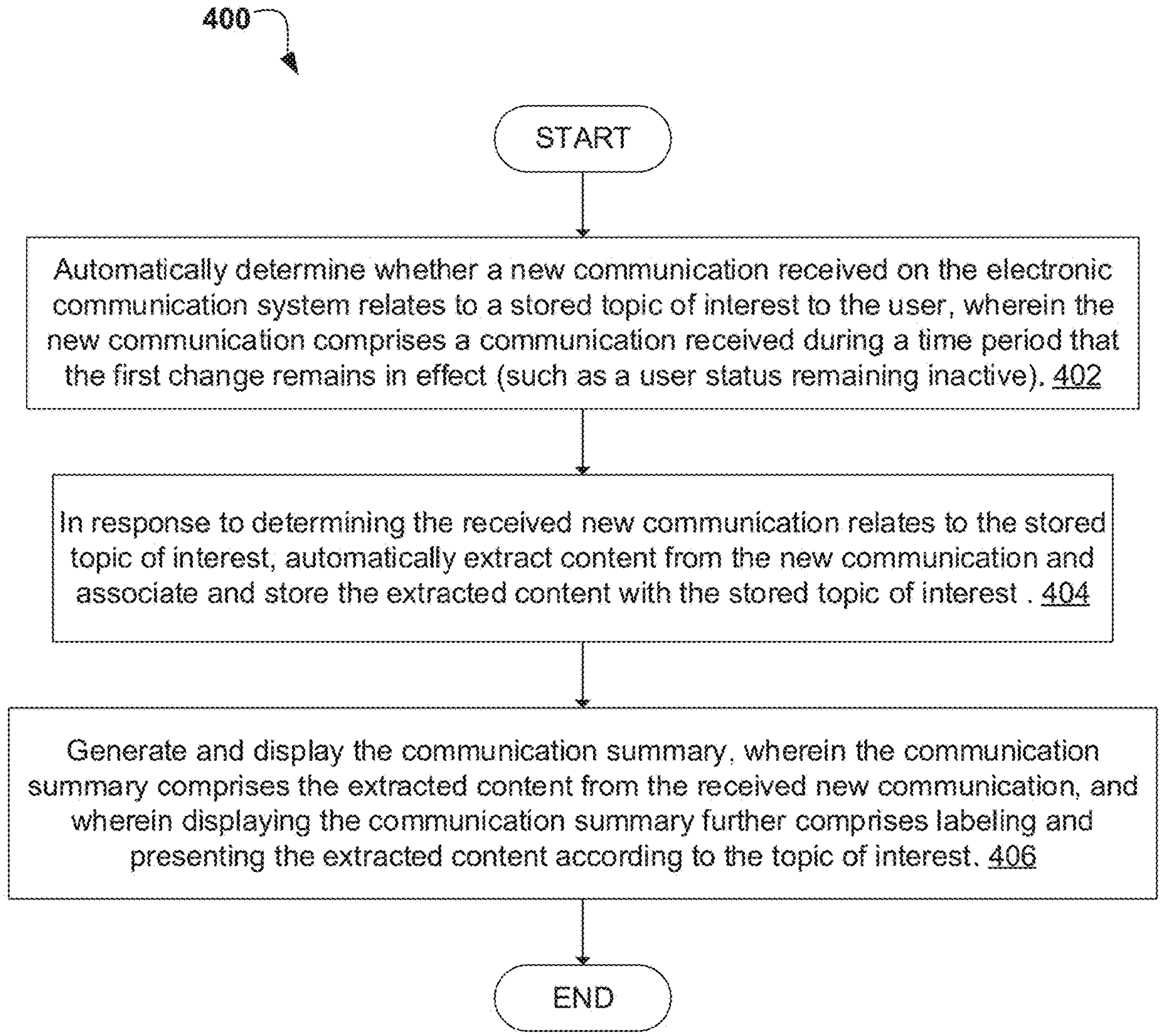
FIG. 4 is an operational flowchart for the electronic communication summarization program 160 for automatically and electronically generating the example communication summary based on communications received on one or more electronic communication systems according to one embodiment.

Therefore, and as depicted in an operational flowchart 400 in FIG. 4 for the electronic communication summarization program 160 for automatically and electronically generating a communication summary based on communications received on one or more electronic communication systems, the electronic communication summarization program 160 may, in response to detecting a first change in a user status (i.e. indicating that a user is inactive) on an electronic communication system, automatically determine whether a new communication received on the electronic communication system relates to a stored topic of interest to the user at 402, wherein the new communication comprises a communication received during a time period that the first change remains in effect (such as a user status remaining inactive). Then, at 404, in response to determining the received new communication relates to the stored topic of interest, the electronic communication summarization program 160 may automatically extract content from the new communication and associate and store the extracted content with the stored topic of interest. Next, at 406, the electronic communication summarization program 160 may generate and display the communication summary 300, wherein the communication summary 300 comprises the extracted content from the received new communication, and wherein displaying the communication summary 300 further comprises labeling and presenting the extracted content according to the topic of interest.

It may be appreciated that FIGS. 2-4 provide only illustrations of one implementation and does not imply any limitations with regard to how different embodiments may be implemented. Many modifications to the depicted environments may be made based on design and implementation requirements. For example, and as previously described, the electronic communication summarization program 160 may use the analysis component 204 to track and detect a user status entered by the user. According to one embodiment, the user status may be a toggle function/feature associated with a notification setting on the computer 101 and/or on an electronic communication program/system whereby the toggle may be between a user indicating that the user is actively monitoring new communications or not actively monitoring new communications. According to one embodiment, if the toggle feature/function is set to not actively monitoring communications, even when the user is automatically detected by the electronic communication summarization program 160 as being active on a computer 101 or on an electronic communication program/system, the electronic communication summarization program 160 may process new communications for redisplay on a communication summary 300 via the process described above. As such, in response to detecting the toggle feature/function is set to not actively monitoring new communications, the electronic communication summarization program 160 may process the new/incoming communications such that certain new communications may be displayed in a communication summary 300 based on the relation of the new communication to a topic of interest. In this instance, and according to one embodiment, in response to receiving a new communication related to a topic of interest, the electronic communication summarization program 160 may present a real-time notification to the user to notify the user that there is/are new communications (unread/missed content) associated with a topic of interest to the user, and upon action from the user (such as the user clicking on the notification), the electronic communication summarization program 160 may present the communication summary 300 via a pop-up window which may include the topic of interest 302, content from the new communication 304 associated with the topic of interest 302, the timestamps 306 in which the new communications 304 was received, the interest percentages 308 associated with the topic of interest 302, and an indication 310 of whether the topic of interest was user-generated (represented by "YES") or automatically generated by the electronic communication summarization program 160 (represented by "NO").

As previously described, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

What is claimed is:

1. A computer-implemented method for automatically and electronically generating a communication summary based on communications received on one or more electronic communication systems, comprising:

automatically determining whether new and different communications received on a plurality of different electronic communication systems relate to one or more stored topics of interest to a user, wherein the one or more stored topics of interest are determined using natural language processing and machine learning algorithms to process received communications for which the user showed interest, identifying and extracting keywords and phrases associated with the received communications, and subsequently determining a topic based on the extracted keywords and phrases by grouping related material and generating a keyword or phrase representative of a topic common to the received communications using similarity algorithms and topic modeling;

in response to determining that the received new and different communications relate to the one or more stored topics of interest, automatically extracting content from the new and different communications, and associating and storing the extracted content with at least one related topic of interest from the one or more stored topics of interest; and automatically generating and displaying the communication summary, wherein generating the communication summary further comprises generating a user interface window including the extracted content from the received new and different communications from the plurality of different electronic communication systems, and wherein displaying the communication summary further comprises presenting and labeling the new and different communications with the at least one related topic of interest in the user interface window.

2. The computer-implemented method of claim 1, wherein automatically determining whether the new and different communications received on the plurality of different electronic communication systems relate to the one or more stored topics of interest to the user further comprises:

automatically determining whether the new and different communications received on the plurality of different electronic communication systems relate electronic to the one or more stored topics of interest to the user in response to detecting a first change to a user status on the plurality of different electronic communication systems, wherein the new and different communications comprise communications received during a time period that the first change in the user status remains in effect.

3. The computer-implemented method of claim 2, wherein the first change to the user status comprises a switch in the user status from an active status to an inactive status associated with the user and the plurality of different electronic communication systems.

4. The computer-implemented method of claim 2, wherein automatically generating and displaying the communication summary further comprises:

automatically generating and displaying the communication summary in response to detecting a second change to the user status, wherein detecting the second change to the user status comprises detecting a switch in the user status from an inactive status to an active status associated with the user and the plurality of different electronic communication systems.

5. The computer-implemented method of claim 1, further comprising:

Tracking the received communications on the plurality of different electronic communication systems;

tracking user activity and interactions with the received communications;

in response to detecting user interest in a communication based on the tracked user activity and interactions, using the natural language processing and the machine learning algorithms on the communication to identify and generate a topic of interest representative of the communication.

6. The computer-implemented method of claim 5, further comprising:

in response to determining that the generated topic of interest does not match the one or more stored topics of interest, generating a new entry on a database for the generated topic of interest and assigning an interest percentage to the new entry;

in response to determining that the generated topic of interest does match at least one stored topic of interest from the one or more stored topics of interest, updating the interest percentage for the at least one stored topic of interest matching the generated topic of interest.

7. The computer-implemented method of claim 1, further comprising:

ranking the one or more stored topics of interest; and automatically generating and displaying the new and different communications on the communication summary based on the ranking.

8. A computer system for automatically and electronically generating a communication summary based on communications received on one or more electronic communication systems, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

automatically determining whether new and different communications received on a plurality of different electronic communication systems relate to one or more stored topics of interest to a user, wherein the one or more stored topics of interest are determined using natural language processing and machine learning algorithms to process received communications for which the user showed interest, identifying and extracting keywords and phrases associated with the received communications, and subsequently determining a topic based on the extracted keywords and phrases by grouping related material and generating a keyword or phrase representative of a topic common to the received communications using similarity algorithms and topic modeling;

in response to determining that the received new and different communications relate to the one or more stored topics of interest, automatically extracting content from the new and different communications, and associating and storing the extracted content with at least one related topic of interest from the one or more stored topics of interest; and automatically generating and displaying the communication summary, wherein generating the communication summary further comprises generating a user interface window including the extracted content from the received new and different communications from the plurality of different electronic communication systems, and wherein displaying the communication summary further comprises presenting and labeling the new and different communications with the at least one related topic of interest in the user interface window.

9. The computer system of claim 8, wherein automatically determining whether the new and different communications received on the plurality of different electronic communication systems relate to the one or more stored topics of interest to the user further comprises:

automatically determining whether the new and different communications received on the plurality of different electronic communication systems relate to the one or more stored topics of interest to the user in response to detecting a first change to a user status on the plurality of different electronic communication systems, wherein the new and different communications comprise communications received during a time period that the first change in the user status remains in effect.

10. The computer system of claim 9, wherein the first change to the user status comprises a switch in the user status from an active status to an inactive status associated with the user and the plurality of different electronic communication systems.

11. The computer system of claim 9, wherein automatically generating and displaying the communication summary further comprises:

automatically generating and displaying the communication summary in response to detecting a second change to the user status, wherein detecting the second change to the user status comprises detecting a switch in the user status from an inactive status to an active status associated with the user and the plurality of different electronic communication systems.

12. The computer system of claim 8, further comprising:

tracking the received communications on the plurality of different electronic communication systems;

tracking user activity and interactions with the received communications;

in response to detecting user interest in a communication based on the tracked user activity and interactions, using the natural language processing and the machine learning algorithms on the communication to identify and generate a topic of interest representative of the communication.

13. The computer system of claim 12, further comprising:

in response to determining that the generated topic of interest does not match the one or more stored topics of interest, generating a new entry on a database for the generated topic of interest and assigning an interest percentage to the new entry;

in response to determining that the generated topic of interest does match at least one stored topic of interest from the one or more stored topics of interest, updating the interest percentage for the at least one stored topic of interest matching the generated topic of interest.

14. The computer system of claim 8, further comprising:

ranking the one or more stored topics of interest; and automatically generating and displaying the new and different communications on the communication summary based on the ranking.

15. A computer program product for automatically and electronically generating a communication summary based on communications received on one or more electronic communication systems, comprising:

one or more tangible computer-readable storage devices and program instructions stored on at least one of the one or more tangible computer-readable storage devices, the program instructions executable by a processor, the program instructions comprising:

automatically determining whether new and different communications received on a plurality of different electronic communication systems relate to one or more stored topics of interest to a user, wherein the one or more stored topics of interest are determined using natural language processing and machine learning algorithms to process received communications for which the user showed interest, identifying and extracting keywords and phrases associated with the received communications, and subsequently determining a topic based on the extracted keywords and phrases by grouping related material and generating a keyword or phrase representative of a topic common to the received communications using similarity algorithms and topic modeling;

in response to determining that the received new and different communications relate to the one or more stored topics of interest, automatically extracting content from the new and different communications, and associating and storing the extracted content with at least one related topic of interest from the one or more stored topics of interest; and automatically generating and displaying the communication summary, wherein generating the communication summary further comprises generating a user interface window including the extracted content from the received new and different communications from the plurality of different electronic communication systems, and wherein displaying the communication summary further comprises presenting and labeling the new and different communications with the at least one related topic of interest in the user interface window.

16. The computer program product of claim 15, wherein automatically determining whether the new and different communications received on the plurality of different electronic communication systems relate to the one or more stored topics of interest to the user further comprises:

automatically determining whether the new and different communications received on the plurality of different electronic communication systems relate to the one or more stored topics of interest to the user in response to detecting a first change to a user status on the plurality of different electronic communication systems, wherein the new and different communications comprise communications received during a time period that the first change in the user status remains in effect.

17. The computer program product of claim 16, wherein the first change to the user status comprises a switch in the user status from an active status to an inactive status associated with the user and the plurality of different electronic communication systems.

18. The computer program product of claim 16, wherein automatically generating and displaying the communication summary further comprises:

automatically generating and displaying the communication summary in response to detecting a second change to the user status, wherein detecting the second change to the user status comprises detecting a switch in the user status from an inactive status to an active status associated with the user and the plurality of different electronic communication systems.

19. The computer program product of claim 15, further comprising:

tracking the received communications on the plurality of different electronic communication systems;

tracking user activity and interactions with the received communications;

in response to detecting user interest in a communication based on the tracked user activity and interactions, using the natural language processing and the machine learning algorithms on the communication to identify and generate a topic of interest representative of the communication.

20. The computer program product of claim 19, further comprising:

in response to determining that the generated topic of interest does not match the one or more stored topics of interest, generating a new entry on a database for the generated topic of interest and assigning an interest percentage to the new entry;

in response to determining that the generated topic of interest does match at least one stored topic of interest from the one or more stored topics of interest, updating the interest percentage for the at least one stored topic of interest matching the generated topic of interest.

* * * * *